(12) United States Patent
Kusase (10) Patent No.: US 10,090,741 B2
(45) Date of Patent: Oct. 2, 2018

(54) DOUBLE-STATOR ROTATING ELECTRIC MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 482 days.

(21) Appl. No.: 14/955,620

(22) Filed: Dec. 1, 2015

(65) Prior Publication Data

US 2016/0164386 A1 Jun. 9, 2016

(30) Foreign Application Priority Data

Dec. 8, 2014 (JP) .................................. 2014-247850

(51) Int. Cl.
*H02K 16/04* (2006.01)
*H02K 3/28* (2006.01)
*H02K 1/27* (2006.01)

(52) U.S. Cl.
CPC ............. *H02K 16/04* (2013.01); *H02K 1/276* (2013.01); *H02K 1/2786* (2013.01); *H02K 3/28* (2013.01)

(58) Field of Classification Search
CPC ...... H02K 16/04; H02K 1/276; H02K 1/2786; H02K 3/28
See application file for complete search history.

(56) References Cited

U.S. PATENT DOCUMENTS

| 4,520,287 | A | * | 5/1985 | Wang | ........................ | H02K 3/28 29/596 |
| 7,791,245 | B1 | * | 9/2010 | Hao | ........................ | H02K 21/12 310/114 |
| 2003/0214190 | A1 | * | 11/2003 | Congdon | .................. | H02K 3/28 310/71 |
| 2006/0028085 | A1 | * | 2/2006 | Qu | ........................... | H02K 3/28 310/178 |
| 2010/0019589 | A1 | * | 1/2010 | Saban | ........................ | H02K 1/02 310/52 |
| 2016/0028296 | A1 | * | 1/2016 | Kusase | .................. | H02K 21/12 310/156.01 |

FOREIGN PATENT DOCUMENTS

JP 2007-261342 A 10/2007

* cited by examiner

*Primary Examiner* — Mohamad Musleh
(74) *Attorney, Agent, or Firm* — Oliff PLC (57) ABSTRACT

A double-stator rotating electric machine includes a rotor, an outer stator having an outer multi-phase coil wound thereon, and an inner stator having an inner multi-phase coil wound thereon. Each corresponding pair of phase windings of the outer and inner multi-phase coils are formed of at least one common electric conductor wire. The electric conductor wire includes a bridging portion that bridges the corresponding pair of phase windings of the outer and inner multi-phase coils across the rotor. The bridging portion extends obliquely with respect to both radial and circumferential directions of the rotor so that radially outer and radially inner ends of the bridging portion, which are respectively connected to the corresponding pair of phase windings of the outer and inner multi-phase coils, are circumferentially offset from each other by an offset angle θ. The offset angle θ is greater than 0° and less than 180° in electrical angle.

7 Claims, 9 Drawing Sheets

- ⊙ ELECTRIC CURRENT FLOWING OUT OF PAPER SURFACE
- ⊗ ELECTRIC CURRENT FLOWING INTO PAPER SURFACE

DOUBLE-STATOR ROTATING ELECTRIC MACHINE

CROSS-REFERENCE TO RELATED APPLICATION

This application is based on and claims priority from Japanese Patent Application No. 2014-247850 filed on Dec. 8, 2014, the content of which is hereby incorporated by reference in its entirety into this application.

BACKGROUND

1. Technical Field

The present invention relates to double-stator rotating electric machines which include a rotor, an outer stator disposed radially outside the rotor, and an inner stator disposed radially inside the rotor.

2. Description of Related Art

Japanese Patent Application Publication No. JP2007261342A discloses an in-wheel motor which includes a rotor and a pair of outer and inner stators. The rotor is connected to a wheel shaft so as to rotate together with the wheel shaft. The outer stator is fixed to a housing so as to be positioned radially outside the rotor with an outer gap formed therebetween. The inner stator is fixed to the housing so as to be positioned radially inside the rotor with an inner gap formed therebetween. That is to say, the in-wheel motor is a double-gap and double-stator motor.

Moreover, in the in-wheel motor, the outer stator includes a plurality of iron cores each having a coil wound thereon. The inner stator includes an iron core having a plurality of protruding pieces; each of the protruding pieces has a coil wound thereon. The rotor includes an annular rotor core, a plurality of outer permanent magnets and a plurality of inner permanent magnets. The rotor core is formed by laminating a plurality of thin steel sheets. The rotor core has a plurality of fitting holes that are formed in a radially outer surface of the rotor core along a circumferential direction of the rotor core. Each of the outer permanent magnets is fitted in one of the fitting holes of the rotor core. Each of the inner permanent magnets is attached on a radially inner surface of the rotor core along the circumferential direction so as to be radially aligned with one of the outer permanent magnets.

With the above configuration, magnetomotive forces of the outer and inner stators are serially arranged with each other. In other words, the in-wheel motor has a serial arrangement of the magnetomotive forces of the outer and inner stators.

Moreover, since the coils of the outer stator are provided separately from the coils of the inner stator, the parts count of the in-wheel motor and thus the number of manufacturing steps of the in-wheel motor are large. In addition, the coil end height (i.e., the axial length of coil ends that protrude from corresponding axial end faces of the cores of the outer and inner stators) is also large.

On the other hand, the magnetomotive forces of the outer and inner stators may be arranged parallel to each other. In this case, for each radially-aligned pair of the coils of the outer and inner stators, electric currents respectively flowing in the pair of the coils are opposite in phase to each other; therefore, it is possible to use a bridging wire, which radially extends across the rotor, to bridge (or electrically connect) the pair of the coils. In other words, it is possible to integrally form the pair of the coils of the outer and inner stators and the bridging wire bridging them into one piece. Consequently, with the integral formation, it is possible to reduce the coil end height.

However, with the parallel arrangement of the magnetomotive forces of the outer and inner stators, the outer magnetic flux loops (i.e., the loops of magnetic flux flowing through the outer stator and a radially outer half of the rotor) are formed separately from the inner magnetic flux loops (i.e., the loops of magnetic flux flowing through the inner stator and a radially inner half of the rotor). Moreover, both the outer magnetic flux loops and the inner magnetic flux loops flow through the rotor in the same direction. Consequently, magnetic saturation of the rotor may occur.

In comparison, in the case of serially arranging the magnetomotive forces of the outer and inner stators, it is possible to prevent magnetic saturation of the rotor from occurring. However, in this case, it may be difficult to minimize the coil end height.

SUMMARY

According to an exemplary embodiment, there is provided a double-stator rotating electric machine which includes a rotor, an outer stator and an inner stator. The outer stator is disposed radially outside the rotor with an outer gap formed therebetween. The outer stator has an outer multi-phase coil wound thereon. The inner stator is disposed radially inside the rotor with an inner gap formed therebetween. The inner stator has an inner multi-phase coil wound thereon. Each corresponding pair of phase windings of the outer and inner multi-phase coils are formed of at least one common electric conductor wire. The electric conductor wire includes a bridging portion that bridges the corresponding pair of phase windings of the outer and inner multi-phase coils across the rotor. The bridging portion extends obliquely with respect to both radial and circumferential directions of the rotor so that radially outer and radially inner ends of the bridging portion, which are respectively connected to the corresponding pair of phase windings of the outer and inner multi-phase coils, are circumferentially offset from each other by an offset angle θ. The offset angle θ is greater than 0° and less than 180° in electrical angle.

With the above configuration, the magnetomotive forces of the outer and inner stators are offset in phase from each other by the offset angle θ that is greater than 0° and less than 180° in electrical angle. That is, the magnetomotive forces of the outer and inner stators are arranged neither in parallel nor in series with each other. Consequently, compared to the case of arranging the magnetomotive forces of the outer and inner stators parallel to each other (i.e., θ=0° in electrical angle), it is more difficult for magnetic saturation of the rotor to occur and thus it is possible to improve the performance of the rotating electric machine. Moreover, compared to the case of serially arranging the magnetomotive forces of the outer and inner stators (i.e., θ=180° in electrical angle), it is possible to reduce the coil end height and thus the size of the rotating electric machine.

It is preferable that 60°≤θ≤150°. In this case, it is possible to considerably improve the performance of the rotating electric machine while considerably reducing the coil end height and thus the size of the rotating electric machine.

It is more preferable that θ=90°. In this case, it is possible to maximize the torque of the rotating electric machine while minimizing the coil end height and thus the size of the rotating electric machine.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings.

DESCRIPTION OF EMBODIMENT

Figure 1:
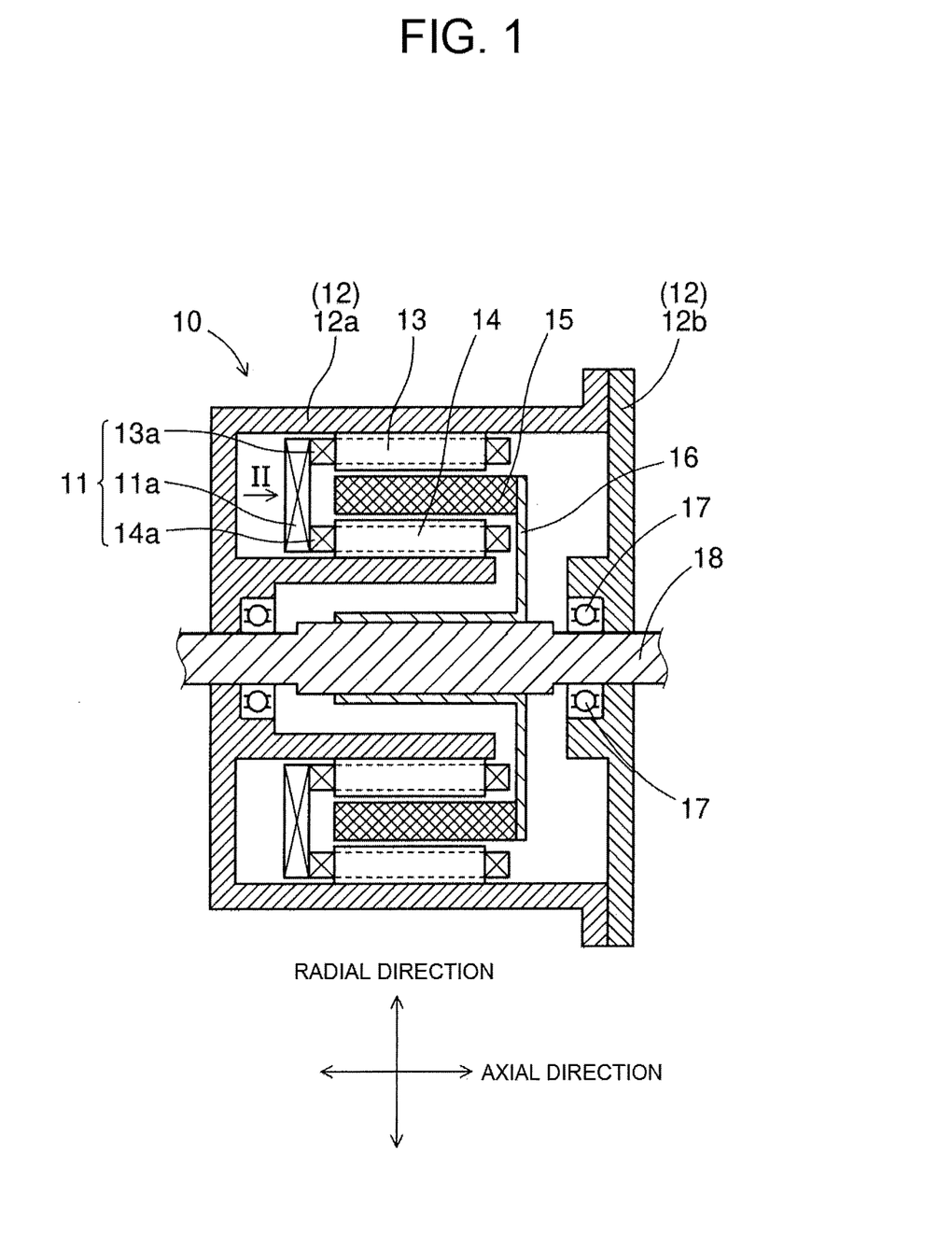
FIG. 1 is a cross-sectional view of a double-stator rotating electric machine according to the exemplary embodiment.

FIG. 1 shows the overall configuration of a double-stator rotating electric machine 10 according to an exemplary embodiment.

In this embodiment, the rotating electric machine 10 is configured as a motor-generator that selectively functions either as an electric motor or as an electric generator.

As shown in FIG. 1, the rotating electric machine 10 includes a housing 12, an outer stator 13, an inner stator 14, a rotor 15, a disc 16, a pair of bearings 17 and a rotating shaft 18.

The housing 12 includes a main body 12a and a cover 12b. The main body 12a is substantially cup-shaped to have an open end. The cover 12b is disc-shaped and fixed to the main body 12a so as to cover the open end of the main body 12a.

Moreover, in the housing 12, there are provided the pair of bearings 17 via which the rotating shaft 18 is rotatably supported by the housing 12. In addition, the rotating shaft 18 may have any shape suitable for rotation.

The outer stator 13 is fixed to an outer circumferential wall of the housing 12 so as to be positioned radially outside the rotor 15. The inner stator 14 is fixed to an inner circumferential wall of the housing 12 so as to be positioned radially inside the rotor 15. In other words, the outer and inner stators 13 and 14 are radially opposed to each other with the rotor 15 interposed therebetween. In addition, the outer and inner stators 13 and 14 may be fixed to the housing 12 by any suitable fixing means.

The outer stator 13 has an outer multi-phase coil (e.g., outer three-phase coil) 13a wound thereon, while the inner stator 14 has an inner multi-phase coil (e.g., inner three-phase coil) 14a wound thereon. More specifically, the outer multi-phase coil 13a is wound on a stator core of the outer stator 13, while the inner multi-phase coil 14a is wound on a stator core of the inner stator 14. In addition, each of the stator cores of the outer and inner stators 13 and 14 may be formed of either a laminate of magnetic steel sheets or a single piece of a magnetic material.

The rotor 15 is fixed to the disc 16, and the disc 16 is further fixed to the rotating shaft 18. That is, the rotor 15 is fixed to the rotating shaft 18 via the disc 16. In addition, the rotor 15, the disc 16 and the rotating shaft 18 may be fixed together by any suitable fixing means.

The configuration of the rotor 15 will be described in detail later (see FIG. 4). The disc 16 may have any shape suitable for connecting the rotor 15 and the rotating shaft 18. In the present embodiment, the disc 16 has a hollow cylindrical boss portion formed at a radial center thereof and a flange portion extending radially outward from the boss portion. The rotating shaft 18 is fitted in the hollow space of the boss portion of the disc 16. The rotor 15 is fixed to one surface (i.e., the left surface in FIG. 1) of the flange portion of the disc 16.

Figure 2:
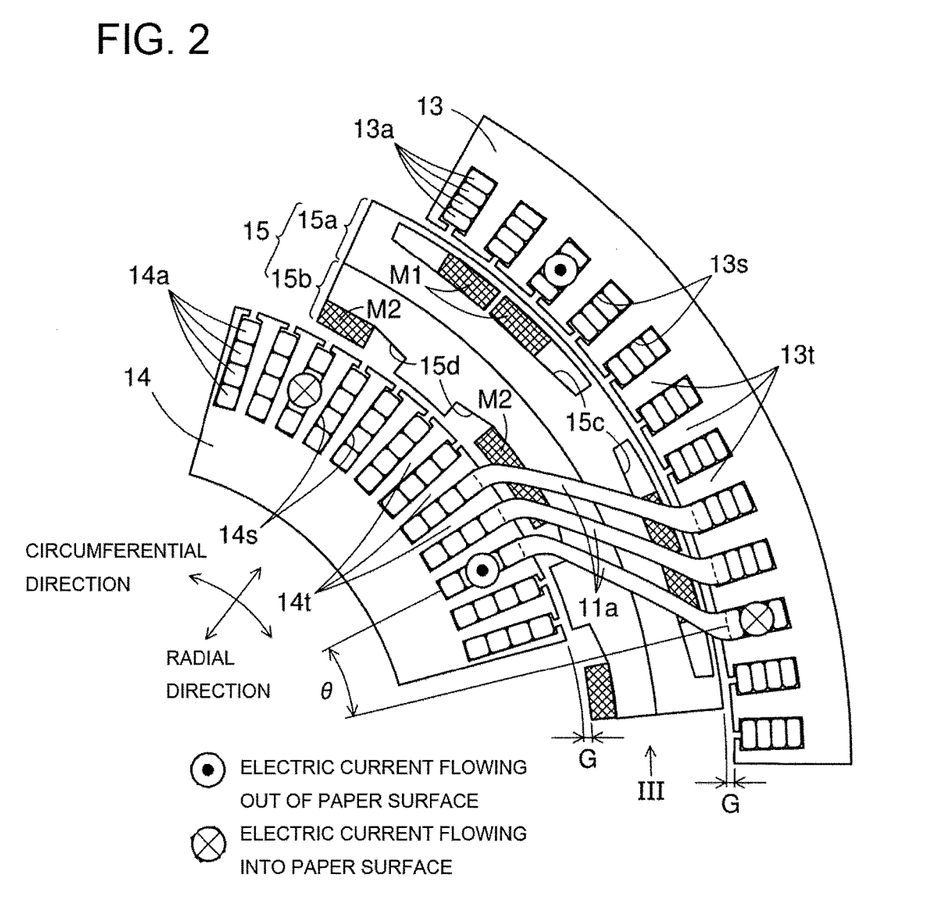
FIG. 2 is an enlarged schematic view, along the direction II in FIG. 1, of part of the double-stator rotating electric machine.

Referring to FIG. 2, between the outer stator 13 and the rotor 15, there is formed an annular outer gap G Similarly, between the inner stator 14 and the rotor 15, there is formed an annular inner gap G In addition, with decrease in the outer and inner gaps it becomes easier for magnetic flux to flow across the gaps thereby increasing the torque. However, at the same time, it also becomes easier for the rotor 15 to make contact with the outer and inner stators 13 and 14 upon application of a large external force or vibration to the rotating electric machine 10. Therefore, the gaps G may be preferably set by taking into consideration both ease of the flow of magnetic flux and avoidance of contact between the rotor 15 and the outer and inner stators 13 and 14. In addition, the outer gap G between the outer stator 13 and the rotor 15 may be set to the same value as or a different value from the inner gap G between the inner stator 14 and the rotor 15.

Figure 3:
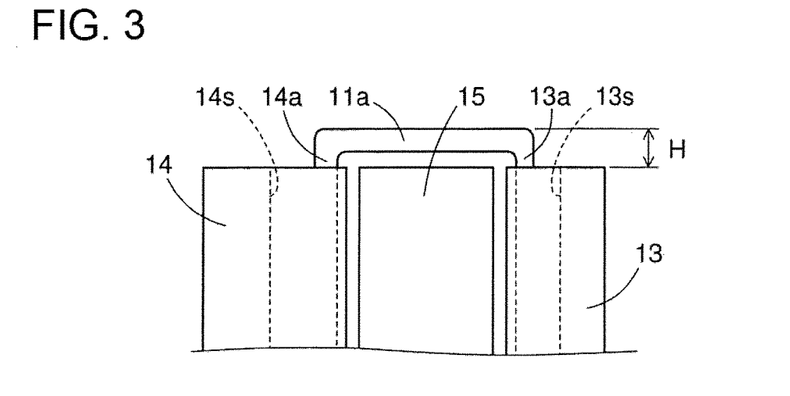
FIG. 3 is an enlarged schematic view, along the direction III in FIG. 2, of part of the double-stator rotating electric machine.

As shown in FIGS. 2-3, the stator core of the outer stator 13 has a plurality of teeth 13t and a plurality of slots 13s. The teeth 13t each radially extend and are circumferentially spaced at a predetermined pitch. Each of the slots 13s is formed between one circumferentially-adjacent pair of the teeth 13t. The outer multi-phase coil 13a is wound on the teeth 13t so as to be received in the slots 13s. Similarly, the stator core of the inner stator 14 has a plurality of teeth 14t and a plurality of slots 14s. The teeth 14t each radially extend and are circumferentially spaced at a predetermined pitch. Each of the slots 14s is formed between one circumferentially-adjacent pair of the teeth 14t. The inner multi-phase coil 14a is wound on the teeth 14t so as to be received in the slots 14s.

In the present embodiment, each of phase windings of the outer multi-phase coil 13a is formed integrally with a corresponding one of phase windings of the inner multi-phase coil 14a using at least one electric conductor wire 11. In other words, each corresponding pair of phase windings of the outer and inner multi-phase coils 13a and 14a are formed of at least one common electric conductor wire 11. As shown in FIGS. 1-3, the electric conductor wire 11 includes a bridging portion 11a that bridges (or electrically connects) the corresponding pair of phase windings of the outer and inner multi-phase coils 13a and 14a across the rotor 15 on one axial side (i.e., the left side in FIG. 1) of the rotor 15. The bridging portion 11a and the corresponding pair of phase windings of the outer and inner multi-phase coils 13a and 14a bridged by the bridging portion 11a together form a substantially U-shape as shown in FIG. 3. In addition, a coil end height H (see FIG. 3) of the outer and inner multi-phase coils 13a and 14a is represented by the axial length of those parts of the outer and inner multi-phase coils 13a and 14a which protrude from the axial end faces of the stator cores of the outer and inner stators 13 and 14.

Moreover, in the present embodiment, the bridging portion 11a extends obliquely with respect to both radial and circumferential directions of the rotor 15 so that the slots 13s and 14s of the outer and inner stators 13 and 14, in which the corresponding pair of phase windings of the outer and inner multi-phase coils 13a and 14a bridged by the bridging portion 11a are respectively received, are circumferential offset from each other by an offset angle θ. That is, the bridging portion 11a is provided between the corresponding pair of phase windings of the outer and inner multi-phase coils 13a and 14a so that radially outer and radially inner ends of the bridging portion 11a are circumferentially offset from each other by the offset angle θ. The offset angle θ is equal to 0° in electrical angle when magnetomotive forces of the outer and inner stators 13 and 14 are arranged parallel to each other. The magnetomotive forces of the outer and inner stators 13 and 14 are generated upon supply of electric current to the outer and inner multi-phase coils 13a and 14a. More specifically, when electric current is supplied to the corresponding pair of phase windings of the outer and inner multi-phase coils 13a and 14a in directions as indicated in FIG. 2, the magnetomotive forces of the outer and inner stators 13 and 14 are offset in phase from each other by the offset angle θ in electrical angle.

As shown in FIG. 2, in the present embodiment, the rotor 15 includes an annular (or hollow cylindrical) rotor core, a plurality of outer permanent magnets M1 and a plurality of inner permanent magnets M2. The rotor core is formed of a soft-magnetic material. More specifically, the rotor core may be formed of either a laminate of soft-magnetic steel sheets or a single piece of a soft-magnetic material. The rotor core is comprised of an outer yoke part 15a facing the outer stator 13 and an inner yoke part 15b facing the inner stator 14. In the outer yoke part 15a, there are formed a plurality of outer receiving portions 15c, in each of which is received one of the outer permanent magnets M1. Similarly, in the inner yoke part 15b, there are formed a plurality of inner receiving portions 15d, in each of which is received one of the inner permanent magnets M2. In addition, the outer yoke part 15a and the inner yoke part 15b may be either integrally formed as one piece or separately formed and then fixed together by any suitable fixing means.

Figure 4:
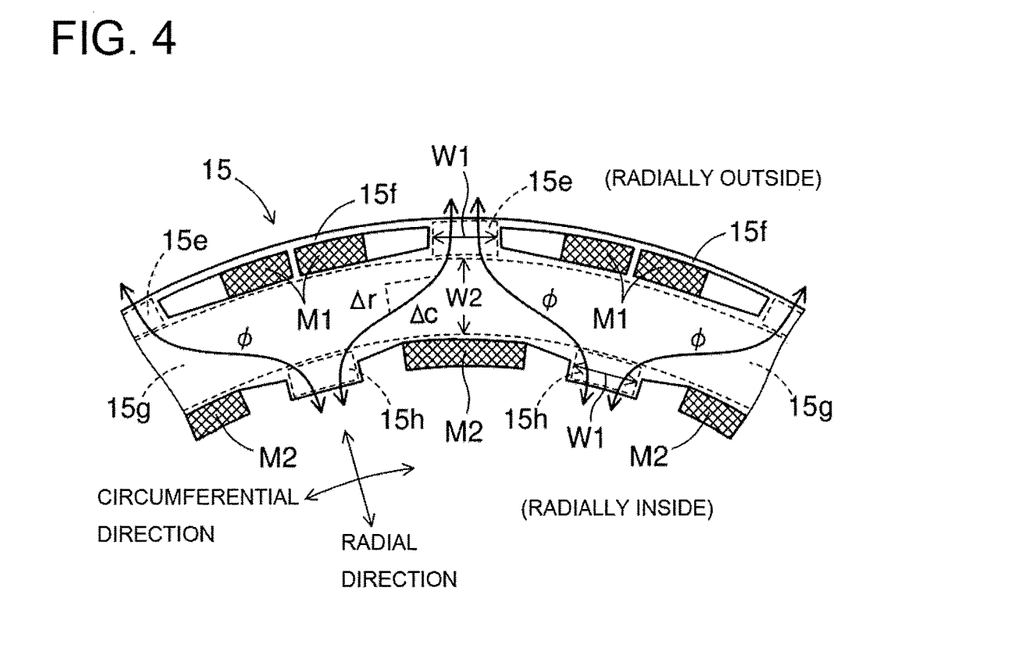
FIG. 4 is a schematic side view of part of a rotor of the double-stator rotating electric machine.

Moreover, as shown in FIG. 4, in the present embodiment, each of the outer permanent magnets M1 is comprised of a pair of permanent magnet segments that are separated from each other by a substantially T-shaped bridge 15f formed in the outer yoke part 15a of the rotor core. The bridge 15f is formed so as to make the outer circumferential surface of the rotor core smooth. On the other hand, each of the inner permanent magnets M2 is formed as a single piece. There is no substantially T-shaped bridge formed in the inner yoke part 15b of the rotor core.

In the present embodiment, the rotor core (i.e., the outer yoke part 15a plus the inner yoke part 15b) includes a main body 15g, a plurality of outer protrusions 15e and a plurality of inner protrusions 15h. The main body 15g is annular-shaped to form a magnetic path via which magnetic flux ϕ flows mainly in the circumferential direction of the rotor 15. Each of the outer protrusions 15e protrudes from the main body 15g radially outward to form a magnetic path via which magnetic flux ϕ flows between the outer stator 13 and the rotor 15 mainly in a radial direction of the rotor 15. Each of the inner protrusions 15h protrudes from the main body 15g radially inward to form a magnetic path via which magnetic flux ϕ flows between the inner stator 14 and the rotor 15 mainly in a radial direction of the rotor 15.

Moreover, in the present embodiment, each of the outer protrusions 15e is circumferentially offset from a corresponding one of the inner protrusions 15h. The amount of the circumferential offset between each corresponding pair of the outer and inner protrusions 15e and 15h may be set to any suitable value. In particular, it is preferable to set the amount of the circumferential offset according to the above-described offset angle θ.

Furthermore, in the present embodiment, the outer protrusions 15e and the inner protrusions 15h have a circumferential width W1, while the main body 15g of the rotor core has a radial width W2. The circumferential width W1 and the radial width W2 may be set to any suitable values according to the type and rating of the rotating electric machine 10. To allow magnetic flux ϕ to smoothly flow through the rotor 15 without causing excessive magnetic saturation of the rotor 15, it is preferable to set the circumferential width W1 and the radial width W2 so as to satisfy the following relationship: $0.5 \leq W2/W1 \leq 1$.

In addition, it should be noted that the circumferential width of the outer protrusions 15e may be set to be different from the circumferential width of the inner protrusions 15h.

As illustrated in FIG. 4, magnetic flux ϕ flowing between the outer and inner stators 13 and 14 has both a circumferential component Δc and a radial component Δr when passing through the rotor 15. In addition, the magnitudes of the circumferential and radial components Δc and Δr vary depending on the position where the magnetic flux ϕ flows.

Figure 5:
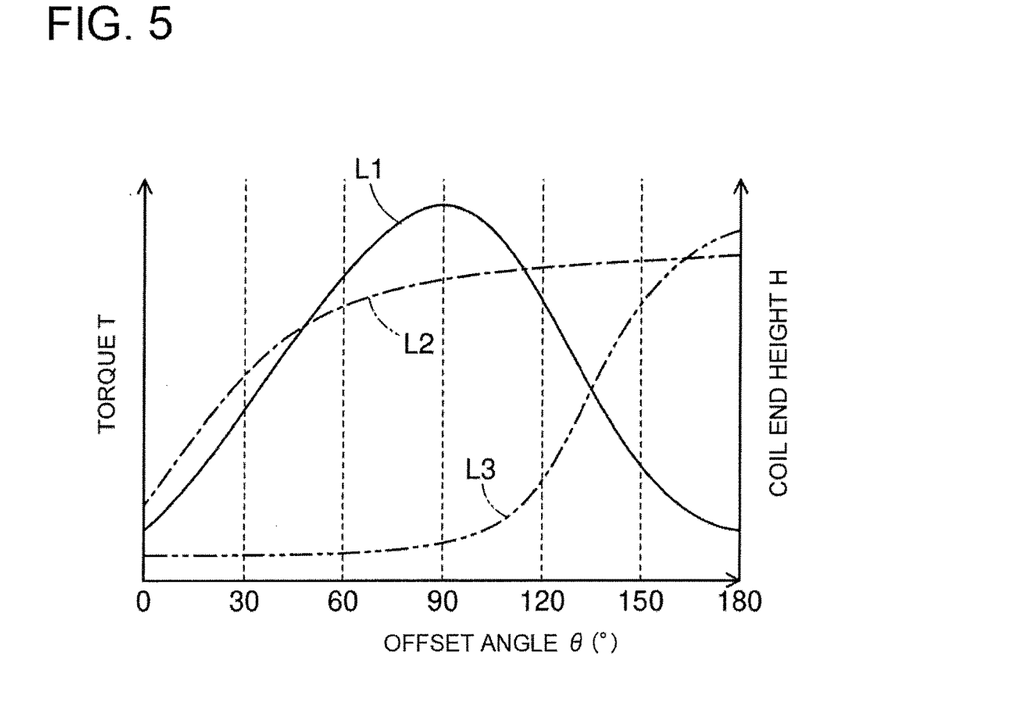
FIG. 5 is a graphical representation illustrating the relationship between torque, coil end height and offset angle.

FIG. 5 illustrates the changes in the torque T and the coil end height H with the offset angle θ in the rotating electric machine 10. Specifically, in FIG. 5, the change in the torque T of the rotating electric machine 10 with the offset angle θ is indicated by a characteristic line (one-dot chain line) L2; the change in the coil end height H with the offset angle θ is indicated by a characteristic line (two-dot chain line) L3; and the change in the ratio (T/H) of the torque T to the coil end height H with the offset angle θ is indicated by a characteristic line (continuous line) L1.

As indicated by the characteristic line L2, the toque T increases rapidly as the offset angle θ increases from 0° to the vicinity of 60°. After the offset angle θ exceeds 60°, the torque T then increases slowly with the offset angle θ. This change in the torque T with the offset angle θ indicates that the performance of the rotating electric machine 10 is improved with the shift of the arrangement of the magnetomotive forces of the outer and inner stators 13 and 14 from the parallel arrangement to the serial arrangement. On the other hand, as indicated by the characteristic line L3, the coil end height H almost remains unchanged as the offset angle θ increases from 0° to the vicinity of 100°. After the offset angle θ exceeds 100°, the coil end height H then increases rapidly with the offset angle θ. This change in the coil end height H with the offset angle θ indicates that the bridging portions 11a are crowded (or densely arranged) with the shift of the arrangement of the magnetomotive forces of the outer and inner stators 13 and 14 from the parallel arrangement to the serial arrangement. Moreover, as indicated by the characteristic line L1, the ratio (T/H) increases with the offset angle θ until reaching its peak at the offset angle θ of 90°. Then, the ratio (T/H) decreases with increase in the offset angle θ.

From FIG. 5, it has been made clear that specifying 0°<θ<180°, it is possible to increase the torque T (or improve the performance) of the rotating electric machine 10 while reducing the coil end height H and thus the size of the rotating electric machine 10 in comparison with the prior art. Moreover, it also has been made clear that specifying 60°≤θ≤150°, it is possible to considerably increase the torque T of the rotating electric machine 10 while considerably reducing the coil end height H and thus the size of the rotating electric machine 10 in comparison with the prior art. Furthermore, it also has been made clear that specifying θ=90°, it is possible to maximize the torque T of the rotating electric machine 10 while minimizing the coil end height H and thus the size of the rotating electric machine 10.

To further investigate the effect of the offset angle θ on the performance of the rotating electric machine 10, analysis was carried out for five models of the rotating electric machine 10.

Specifically, in each of the five models, the outer diameter of the outer stator 13 was 120 mm; the outer diameter of the inner stator 14 was 76 mm; the outer diameter of the rotor 15 was 99.6 mm; the axial length (or lamination thickness) of the rotor 15 was 66 mm; both the number of magnetic poles formed in the outer stator 13 and the number of magnetic poles formed in the inner stator 14 were 12; the phase current supplied to the outer multi-phase coil 13a and the inner multi-phase coil 14a was 150 Arms; the relative permeability of the outer permanent magnets M1 and inner permanent magnets M2 was 1.05; and the coercivity of the outer permanent magnets M1 and inner permanent magnets M2 was 953092 A/m.

Figure 6:
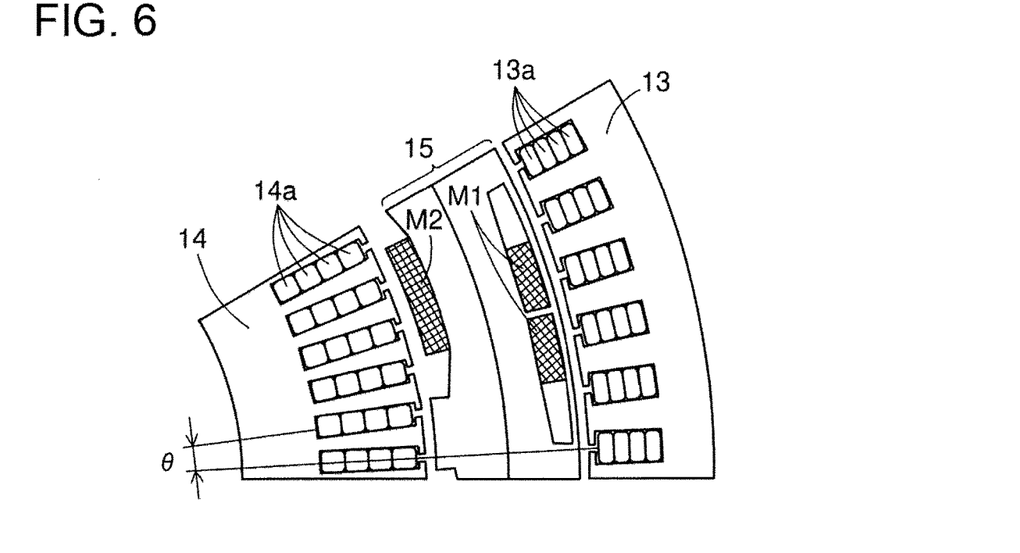
FIG. 6 is a schematic view illustrating the configuration of a first model of the rotating electric machine, wherein the offset angle is equal to 30° in electrical angle.
Figure 7:
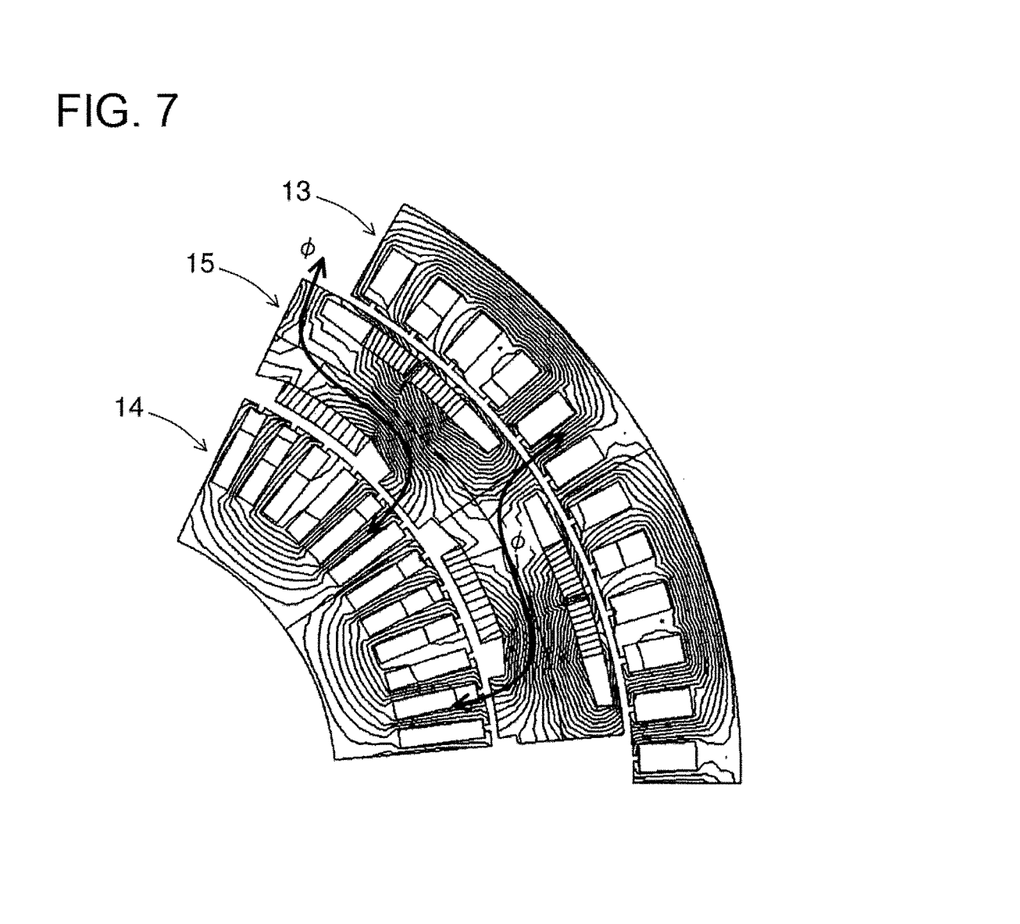
FIG. 7 is a schematic view illustrating the flow of magnetic flux in the first model.
Figure 8:
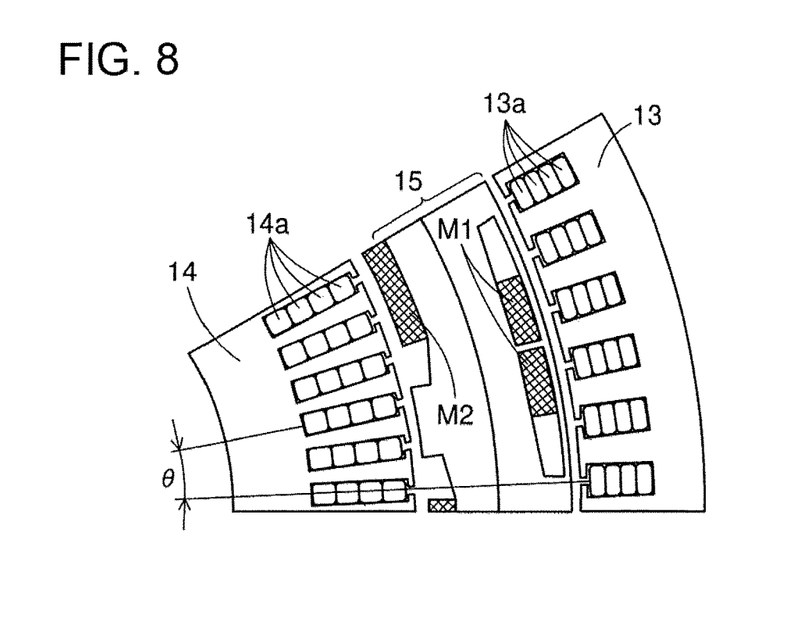
FIG. 8 is a schematic view illustrating the configuration of a second model of the rotating electric machine, wherein the offset angle is equal to 60° in electrical angle.
Figure 9:
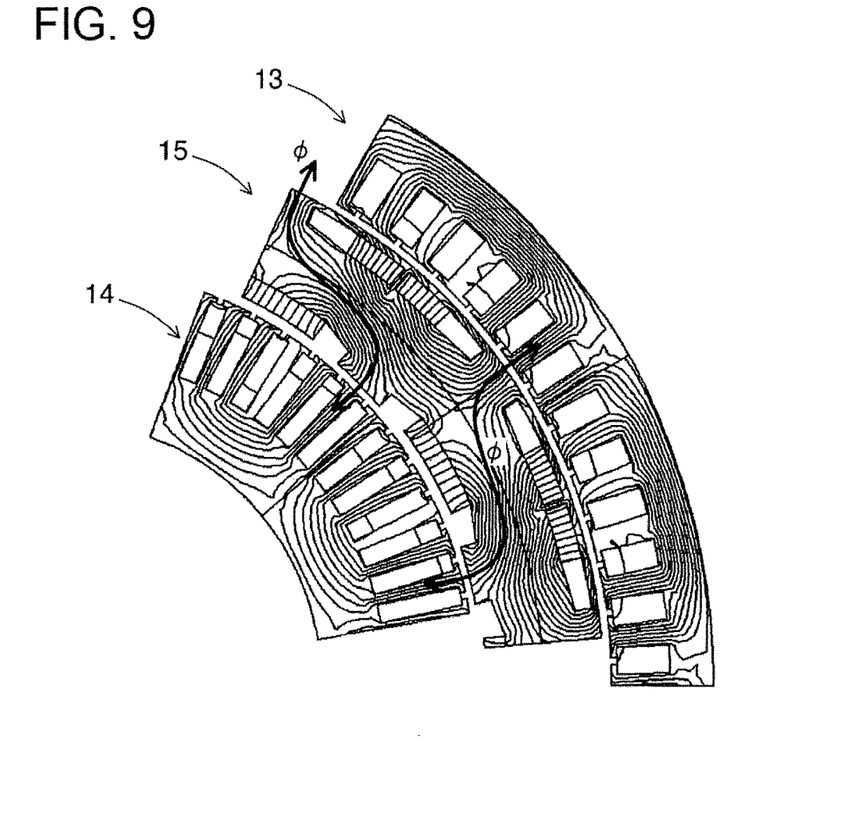
FIG. 9 is a schematic view illustrating the flow of magnetic flux in the second model.
Figure 10:
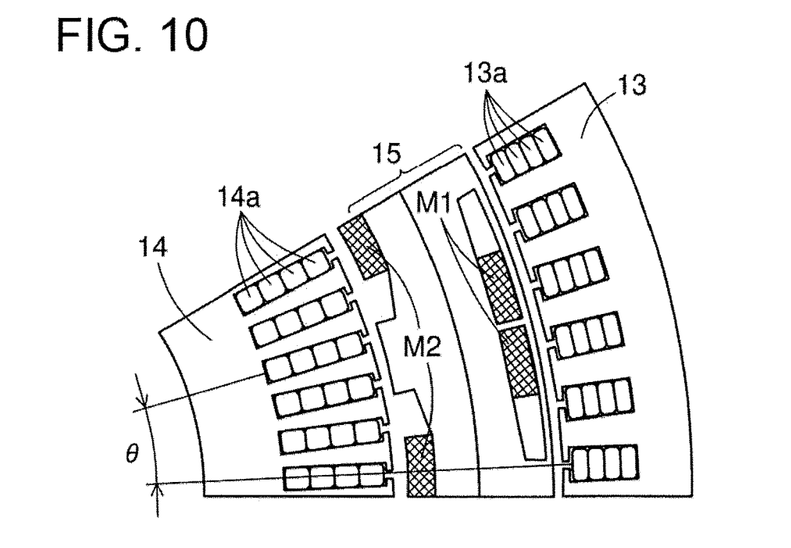
FIG. 10 is a schematic view illustrating the configuration of a third model of the rotating electric machine, wherein the offset angle is equal to 90° in electrical angle.
Figure 11:
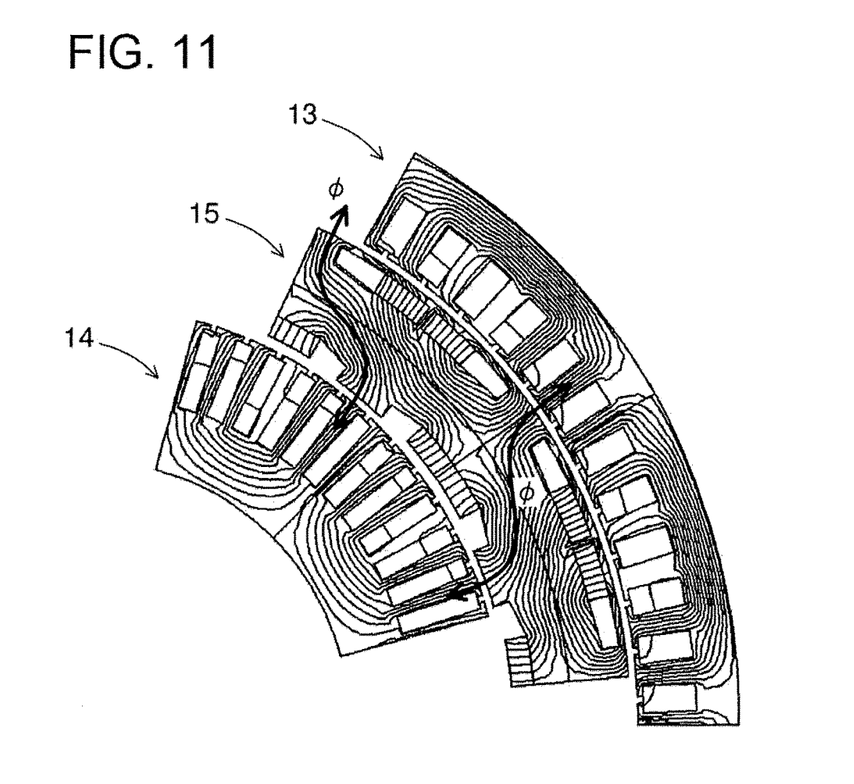
FIG. 11 is a schematic view illustrating the flow of magnetic flux in the third model.
Figure 12:
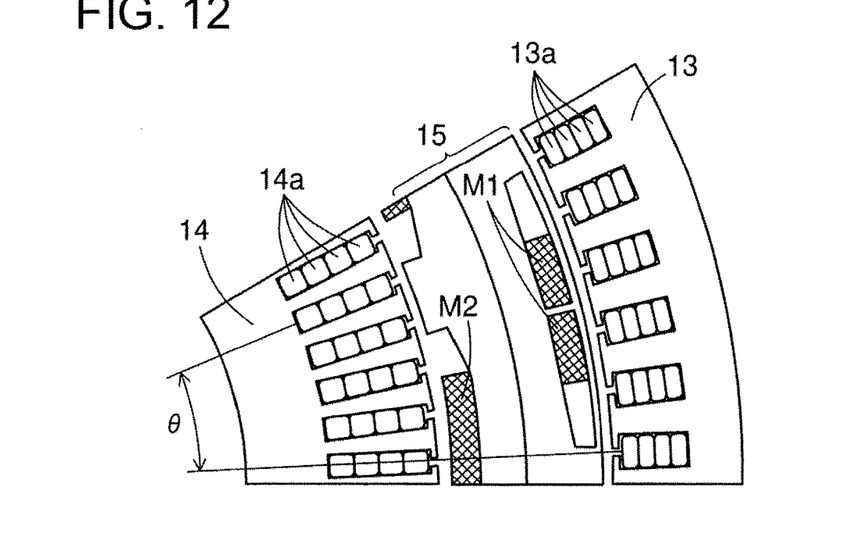
FIG. 12 is a schematic view illustrating the configuration of a fourth model of the rotating electric machine, wherein the offset angle is equal to 120° in electrical angle.
Figure 13:
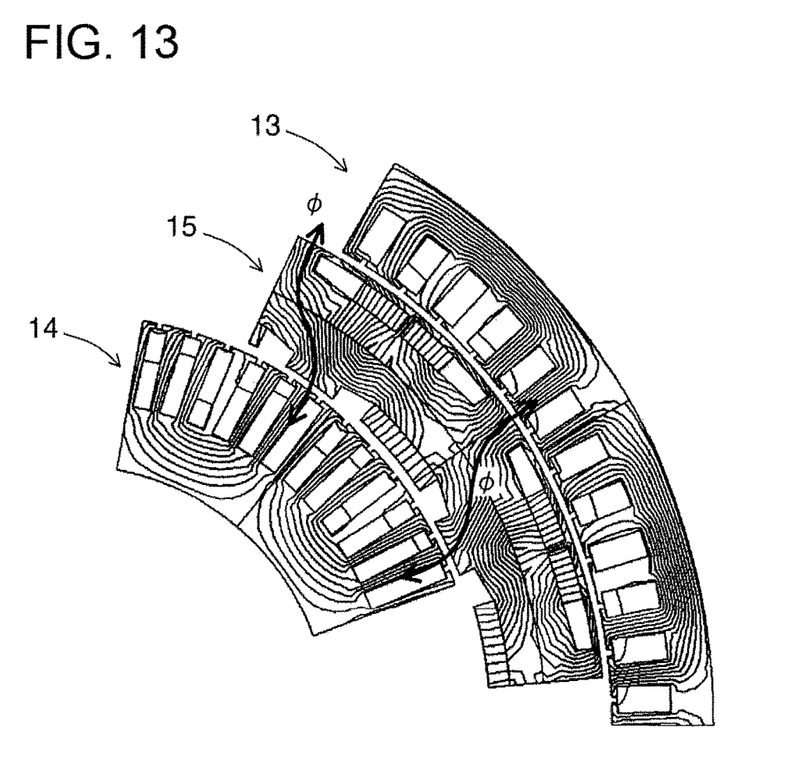
FIG. 13 is a schematic view illustrating the flow of magnetic flux in the fourth model.
Figure 14:
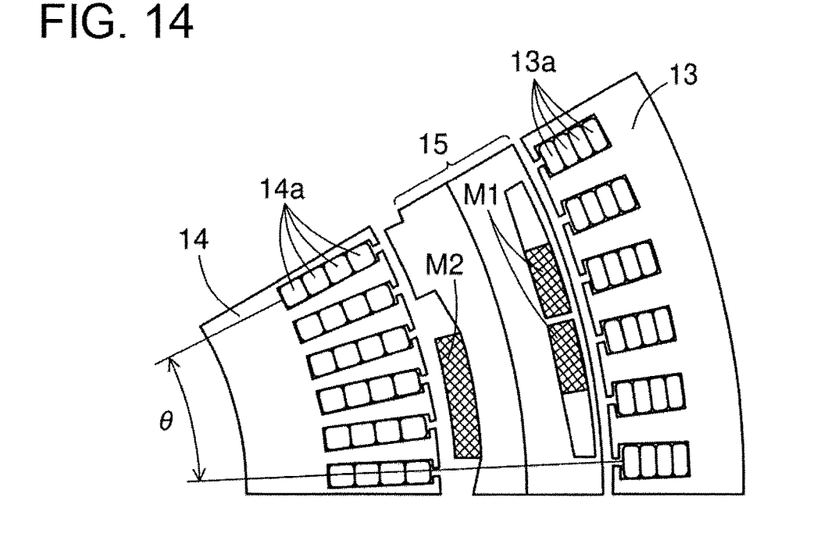
FIG. 14 is a schematic view illustrating the configuration of a fifth model of the rotating electric machine, wherein the offset angle is equal to 150° in electrical angle.
Figure 15:
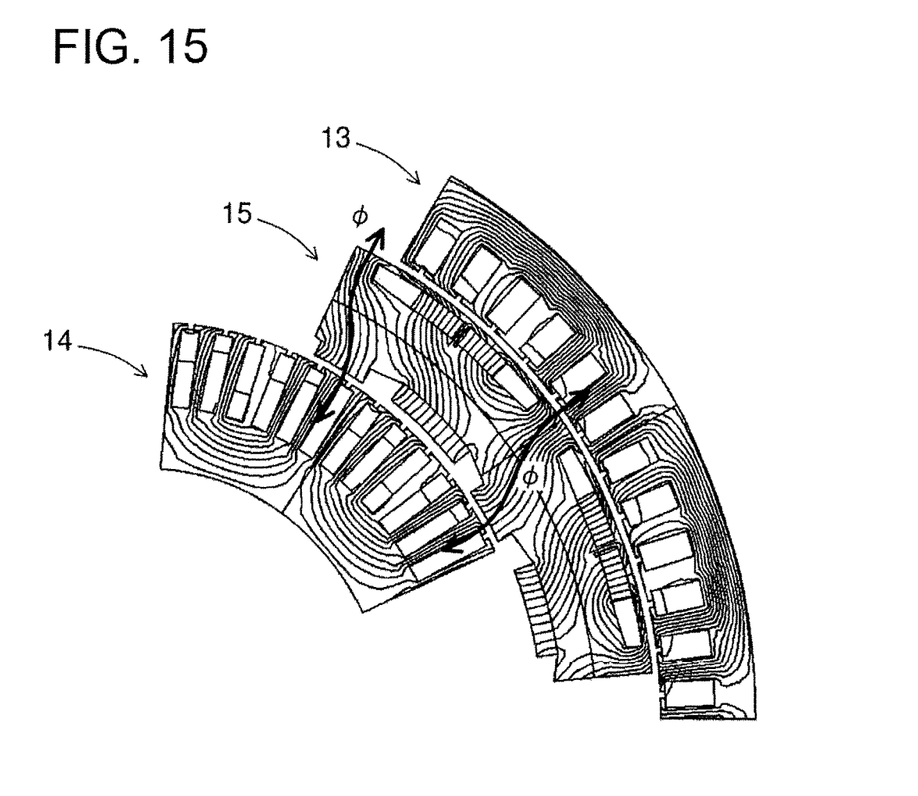
FIG. 15 is a schematic view illustrating the flow of magnetic flux in the fifth model.

FIG. 6 illustrates the configuration of the first model, in which the offset angle θ was 30° in electrical angle. FIG. 7 illustrates the flow of magnetic flux φ in the first model. FIG. 8 illustrates the configuration of the second model, in which the offset angle θ was 60° in electrical angle. FIG. 9 illustrates the flow of magnetic flux φ in the second model. FIG. 10 illustrates the configuration of the third model, in which the offset angle θ was 90° in electrical angle. FIG. 11 illustrates the flow of magnetic flux φ in the third model. FIG. 12 illustrates the configuration of the fourth model, in which the offset angle θ was 120° in electrical angle. FIG. 13 illustrates the flow of magnetic flux φ in the fourth model. FIG. 14 illustrates the configuration of the fifth model, in which the offset angle 74 was 150° in electrical angle. FIG. 15 illustrates the flow of magnetic flux φ in the fifth model. In addition, in FIGS. 7, 9, 11, 13 and 15, the flow of magnetic flux φ is illustrated in the form of contour lines.

As can be seen from FIGS. 7, 9, 11, 13 and 15, the magnetic flux flowing through the rotor 15 had both a circumferential component Δc and a radial component Δr (see also FIG. 4). Moreover, the length of the path of the magnetic flux φ flowing through the rotor 15 decreased with increase in the offset angle θ.

The analysis results are as follows. Taking the torque T obtained with the parallel arrangement (i.e., θ=0°) as a reference (i.e., 100%), the torque T obtained with the first model (i.e., θ=30°) was 107%; the torque T obtained with the second model (i.e., θ=60°) was 115%; the torque T obtained with the third model (i.e., θ=90°) was 120%; the torque T obtained with the fourth model (i.e., θ=120°) was 121%; and the torque T obtained with the fifth model (i.e., θ=150°) was 120%.

From the above results, it has been made clear that to suppress increase in the size of the rotating electric machine 10, it is preferable to set the offset angle θ to be less than or equal to 90°. Moreover, it also has been made clear that to increase the torque T (or improve the performance) of the rotating electric machine 10, it is preferable to set the offset angle θ to be greater than or equal to 60°.

In addition, in setting the offset angle θ according to the type and rating of the rotating electric machine 10, the outer yoke part 15a and the inner yoke part 15b of the rotor core may be formed separately from each other, then arranged so as to be circumferentially offset from each other by the desired offset angle θ, and finally fixed together by any suitable fixing means.

Next, advantages of the double-stator rotating electric machine 10 according to the present embodiment will be described.

In the present embodiment, the double-stator rotating electric machine 10 includes the outer stator 13, the inner stator 14 and the rotor 15. The outer stator 13 is disposed radially outside the rotor 15 with the annular outer gap G formed therebetween. The outer stator 13 has the outer multi-phase coil 13a wound thereon. The inner stator 14 is disposed radially inside the rotor 15 with the annular inner gap G formed therebetween. The inner stator 14 has the inner multi-phase coil 14a wound thereon. Each corresponding pair of phase windings of the outer and inner multi-phase coils 13a and 14a are formed of at least one common electric conductor wire 11. The electric conductor wire 11 includes the bridging portion 11a that bridges the corresponding pair of phase windings of the outer and inner multi-phase coils 13a and 14a across the rotor 15. The bridging portion 11a extends obliquely with respect to both radial and circumferential directions of the rotor 15 so that the radially outer and radially inner ends of the bridging portion 11a, which are respectively connected to the corresponding pair of phase windings of the outer and inner multi-phase coils 13a and 14a, are circumferentially offset from each other by the offset angle θ. The offset angle θ is greater than 0° and less than 180° in electrical angle.

With the above configuration, the magnetomotive forces of the outer and inner stators 13 and 14 are offset in phase from each other by the offset angle θ that is greater than 0° and less than 180° in electrical angle. That is, the magnetomotive forces of the outer and inner stators 13 and 14 are arranged neither in parallel nor in series with each other. Consequently, compared to the case of arranging the magnetomotive forces of the outer and inner stators 13a and 14a parallel to each other (i.e., θ=0° in electrical angle), it is more difficult for magnetic saturation of the rotor 15 to occur and thus it is possible to improve the performance of the rotating electric machine 10. Moreover, compared to the case of serially arranging the magnetomotive forces of the outer and inner stators 13a and 14a (i.e., θ=180° in electrical angle), it is possible to reduce the coil end height H and thus the size of the rotating electric machine 10.

Moreover, specifying 60°≤θ≤150°, it is possible to considerably improve the performance of the rotating electric machine 10 while considerably reducing the coil end height H and thus the size of the rotating electric machine 10.

Furthermore, specifying θ=90°, it is possible to maximize the torque T of the rotating electric machine 10 while minimizing the coil end height H and thus the size of the rotating electric machine 10. In addition, in this case, the outer multi-phase coil 13a and the inner multi-phase coil 14a are electrically orthogonal to each other and thus there is less mutual interference between them; consequently, it is possible to further improve the performance of the rotating electric machine 10.

In the present embodiment, the rotor 15 includes the annular rotor core that is formed of a soft-magnetic material and shaped so as to allow magnetic flux φ flux having both a circumferential component Δc and a radial component Δr to flow through the rotor 15.

With the above configuration, it is possible to suppress magnetic saturation of the rotor 15 and increase the reluctance torque that is generated due to the anisotropy in magnetic reluctance of the rotor 15. Moreover, it is also possible to increase the permeance of a magnetic circuit formed in the rotor 15, thereby making it difficult for the rotor 15 to be demagnetized.

In the present embodiment, the rotor core includes the annular main body 15g and the outer and inner protrusions 15e and 15h each of which radially protrudes from the main body 15g. Moreover, the following relationship is satisfied: 0.5≤W2/W1≤1, where W1 is the circumferential width of the outer and inner protrusions 15e and 15h, and W2 is the radial width of the main body 15g.

With the above configuration, it is possible to secure the flow of magnetic flux φ between the rotor 15 and the outer and inner stators 13 and 14 as well as the flow of magnetic flux φ through the main body 15g, thereby making it difficult for magnetic saturation of the rotor 15 to occur.

In the present embodiment, the rotor 15 has the outer permanent magnets M1 provided in the outer yoke part 15a facing the outer stator 13 and the inner permanent magnets M2 provided in the inner yoke part 15b facing the inner stator 14. Each of the outer permanent magnets M1 is circumferentially offset from a corresponding one of the inner permanent magnets M2 based on the offset angle θ of the bridging portions 11a (see FIG. 4).

With the above configuration, the opposing angle relationship between the outer permanent magnets M1 and the outer stator 13 (or the relative circumferential position of the outer permanent magnets M1 to the outer stator 13) is identical to the opposing angle relationship between the inner permanent magnets M2 and the inner stator 14 (or the relative circumferential position of the inner permanent magnets M2 to the inner stator 14). Therefore, it is possible to maximize the torque T of the rotating electric machine 10. Moreover, the optimal phase of electric current supply to the outer stator 13 relative to the rotational position of the rotor 15 is identical to the optimal phase of electric current supply to the inner stator 14 relative to the rotational position of the rotor 15. Therefore, it is possible to directly connect the outer multi-phase coil 13a and the inner multi-phase coil 14a. Consequently, it is possible to obtain a compact coil end at low cost. Furthermore, magnet torque can be obtained without impeding the flow of magnetic flux φ between the outer stator 13 and the inner stator 14, thereby improving the performance of the entire rotating electric machine 10.

In the present embodiment, the rotor 15 has the outer yoke part 15a facing the outer stator 13 and the inner yoke part 15b facing the inner stator 14. The outer yoke part 15a and the inner yoke part 15b are circumferentially offset from each other based on the offset angle θ of the bridging portions 11a.

With the above configuration, the opposing angle relationship between the outer yoke part 15a and the outer stator 13 (or the relative circumferential position of the outer yoke part 15a to the outer stator 13) is identical to the opposing angle relationship between the inner yoke part 15b and the inner stator 14 (or the relative circumferential position of the inner yoke part 15b to the inner stator 14). Therefore, it is possible to maximize the torque T of the rotating electric machine 10. Moreover, the optimal phase of electric current supply to the outer stator 13 relative to the rotational position of the rotor 15 is identical to the optimal phase of electric current supply to the inner stator 14 relative to the rotational position of the rotor 15. Therefore, it is possible to directly connect the outer multi-phase coil 13a and the inner multi-phase coil 14a. Consequently, it is possible to obtain a compact coil end at low cost. Furthermore, the flow of magnetic flux φ can be reliably secured between the outer stator 13 and the inner stator 14, thereby improving the performance of the entire rotating electric machine 10.

While the above particular embodiment has been shown and described, it will be understood by those skilled in the art that various modifications, changes, and improvements may be made without departing from the spirit of the present invention.

(1) In the above-described embodiment, in the outer yoke part 15a of the rotor core, there are formed the bridges 15f each of which prevents a corresponding one of the outer permanent magnets M1 from protruding radially outward. On the other hand, in the inner yoke part 15b of the rotor core, there are formed no bridges (see FIG. 4).

Figure 16:
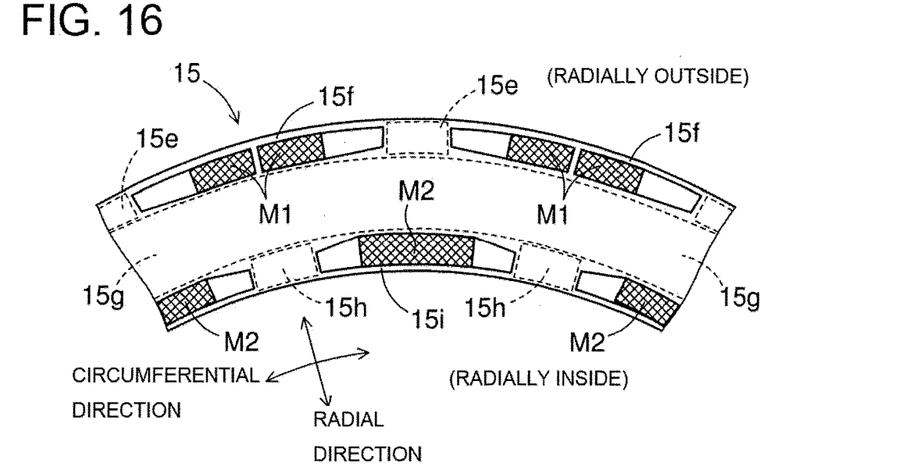
FIG. 16 is a schematic side view of part of a rotor according to a modification.

However, as shown in FIG. 16, it is also possible to form, in the inner yoke part 15b of the rotor core, a plurality of bridges 15i each of which prevents a corresponding one of the inner permanent magnets M2 from protruding radially inward.

(2) In the above-described embodiment, the bridging portion 11a and the corresponding pair of phase windings of the outer and inner multi-phase coils 13a and 14a are integrally formed into one piece (see FIG. 3).

Figure 17:
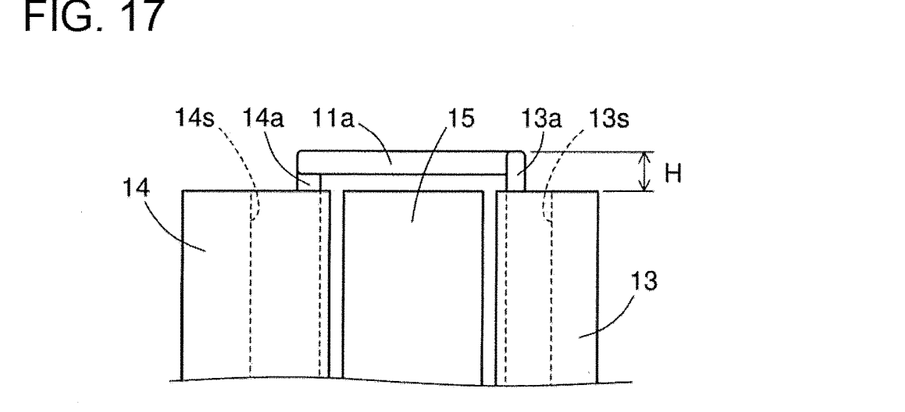
FIG. 17 is a schematic view illustrating the configuration of a bridging portion according to a modification.

However, as shown in FIG. 17, it is also possible to form the bridging portion 11a separately from the corresponding pair of phase windings of the outer and inner multi-phase coils 13a and 14a and then join the bridging portion 11a to the corresponding pair of phase windings.

Figure 18:
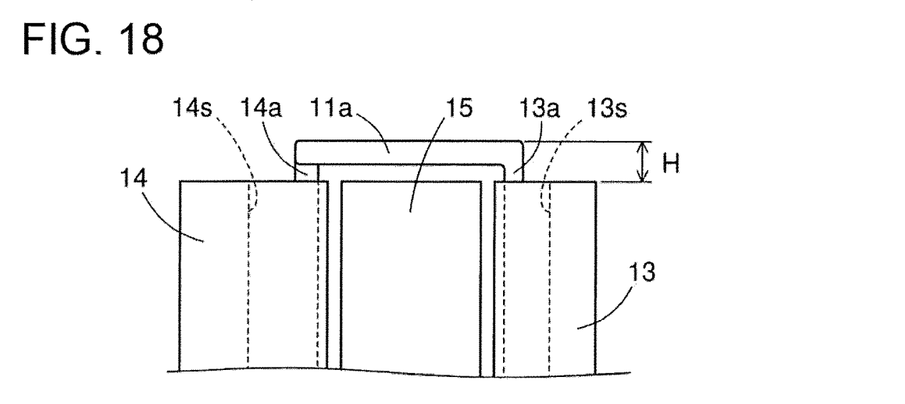
FIG. 18 is a schematic view illustrating the configuration of the bridging portion according to another modification.

Alternatively, as shown in FIG. 18, it is also possible to form the bridging portion 11a integrally with only one of the phase windings of the corresponding pair (e.g., with only the corresponding phase winding of the outer multi-phase coil 13a in FIG. 18) and then join the bridging portion 11a to the other of the phase windings of the corresponding pair (e.g., to the corresponding phase winding of the inner multi-phase coil 14a in FIG. 18).

(3) In the above-described embodiment, the present invention is directed to the double-stator rotating electric machine 10 that is configured as a motor-generator. However, the present invention can also be applied to other types of double-stator rotating electric machines, such as a double-stator electric motor or a double-stator electric generator.

(4) In the above-described embodiment, each of the outer permanent magnets M1 is comprised of a pair of permanent magnet segments; and each of the inner permanent magnets M2 is formed as a single piece (see FIGS. 2 and 4).

However, each of the outer permanent magnets M1 may also be comprised of three or more permanent magnet segments. Each of the inner permanent magnets M2 may also be comprised of two or more permanent magnet segments.

In addition, in the case where each of the inner permanent magnets M2 is also comprised of a plurality of permanent magnet segments, it is preferable to set the number of permanent magnet segments per inner permanent magnet M2 to be less than the number of permanent magnet segments per outer permanent magnet M1.

(5) In the above-described embodiment, the rotor 15 is configured to be rotated by the magnet torque that is generated by the outer and inner permanent magnets M1 and M2 (see FIGS. 2 and 4).

However, the outer and inner permanent magnets M1 and M2 may be omitted from the rotor 15. In this case, the rotor 15 may be configured to be rotated by the reluctance torque that is generated due to the anisotropy in magnetic reluctance of the rotor 15. In addition, in this case, the rotor 15 may or may not include the outer protrusions 15e and the inner protrusions 15h.

(6) In the above-described embodiment, the housing 12 is comprised of the cup-shaped main body 12a and the disc-shaped cover 12b that is fixed to the main body 12a so as to cover the open end of the main body 12a (see FIG. 1).

However, the main body 12a and the cover 12b may have any other shapes such that the outer stator 13, the inner stator 14, the rotor 15 and the rotating shaft 18 can be received in the housing 12. Moreover, the cover 12b may be detachably attached to the main body 12a.

What is claimed is:

1. A double-stator rotating electric machine comprising:
   a rotor;
   an outer stator disposed radially outside the rotor with an outer gap formed therebetween, the outer stator having an outer multi-phase coil wound thereon; and
   an inner stator disposed radially inside the rotor with an inner gap formed therebetween, the inner stator having an inner multi-phase coil wound thereon,
   wherein
   each corresponding pair of phase windings of the outer and inner multi-phase coils are formed of at least one common electric conductor wire,
   the electric conductor wire includes a bridging portion that bridges the corresponding pair of phase windings of the outer and inner multi-phase coils across the rotor,
   the bridging portion extends obliquely with respect to both radial and circumferential directions of the rotor so that radially outer and radially inner ends of the bridging portion, which are respectively connected to the corresponding pair of phase windings of the outer and inner multi-phase coils, are circumferentially offset from each other by an offset angle θ, and
   the offset angle θ is greater than 0° and less than 180° in electrical angle.

2. The double-stator rotating electric machine as set forth in claim 1, wherein the offset angle θ is greater than or equal to 60° and less than or equal to 150° in electrical angle.

3. The double-stator rotating electric machine as set forth in claim 2, wherein the offset angle θ is equal to 90° in electrical angle.

4. The double-stator rotating electric machine as set forth in claim 1, wherein the rotor includes a rotor core that is formed of a soft-magnetic material and shaped so as to allow magnetic flux having both a circumferential component and a radial component to flow through the rotor.

5. The double-stator rotating electric machine as set forth in claim 4, wherein the rotor core includes an annular main body and a plurality of protrusions each of which radially protrudes from the main body, and
   $0.5 \leq W2/W1 \leq 1$, where W1 is a circumferential width of the protrusions and W2 is a radial width of the main body.

6. The double-stator rotating electric machine as set forth in claim 1, wherein the rotor has a plurality of outer permanent magnets provided in a radially outer part of the rotor facing the outer stator and a plurality of inner permanent magnets provided in a radially inner part of the rotor facing the inner stator, and
   each of the outer permanent magnets is circumferentially offset from a corresponding one of the inner permanent magnets based on the offset angle θ of the bridge portion.

7. The double-stator rotating electric machine as set forth in claim 1, wherein the rotor has an outer yoke part facing the outer stator and an inner yoke part facing the inner stator, and
   the outer yoke part and the inner yoke part are circumferentially offset from each other based on the offset angle θ of the bridge portion.

* * * * *